United States Patent
Emmer et al.

(10) Patent No.: US 6,257,282 B1
(45) Date of Patent: Jul. 10, 2001

(54) VACUUM INSULATED PIPE

(75) Inventors: Claus D. Emmer, Prior Lake; Jon R. Turner, Lakeville, both of MN (US)

(73) Assignee: MVE, Inc., New Prague, MN (US)

( * ) Notice: Subject to any disclaimer, the term of this patent is extended or adjusted under 35 U.S.C. 154(b) by 0 days.

(21) Appl. No.: 09/366,915

(22) Filed: Aug. 4, 1999

Related U.S. Application Data

(63) Continuation-in-part of application No. 09/181,297, filed on Oct. 28, 1998.

(51) Int. Cl.$^7$ .................................................. F16L 9/00
(52) U.S. Cl. ........................... 138/149; 130/120; 130/114; 130/109
(58) Field of Search ........................ 138/118, 121, 138/114, 109, 122, 120, 149

(56) References Cited

U.S. PATENT DOCUMENTS

| | | | |
|---|---|---|---|
| 2,260,500 | * | 10/1941 | Wylie . |
| 3,146,005 | * | 8/1964 | Peyton ............................ 138/148 X |
| 4,491,347 | * | 1/1985 | Gustafson ............................ 285/47 |
| 4,515,397 | * | 5/1985 | Nowobilski et al. ............ 138/149 X |
| 4,848,408 | * | 7/1989 | Fortmann et al. .................... 138/104 |
| 5,678,610 | * | 10/1997 | Scarazzo et al. .................... 138/109 |
| 5,803,128 | * | 9/1998 | Reed ................................ 138/109 X |
| 5,819,807 | * | 10/1998 | Reed ................................ 138/109 X |
| 5,915,735 | * | 6/1999 | Noble ................................ 138/119 X |

* cited by examiner

Primary Examiner—Patrick Brinson
(74) Attorney, Agent, or Firm—Piper Marbury Rudnick & Wolfe

(57) ABSTRACT

Prefabricated insulated pipe sections are constructed of an inner pipe surrounded by a concentrically-positioned outer pipe. End portions of the inner and outer pipes are joined with bellow members so that an annular space is defined. A portion of the inner pipe is wrapped with layers of insulation material with inert insulating granules positioned between the layers. The annular space is partially evacuated to below atmospheric pressure. Multiple pipe sections may be joined by their inner pipes through brazing or other known methods. The joints and neighboring bellow members on abutting pipe sections are covered by vacuum sleeves that are sealed and provide a vacuum tight joint.

12 Claims, 5 Drawing Sheets

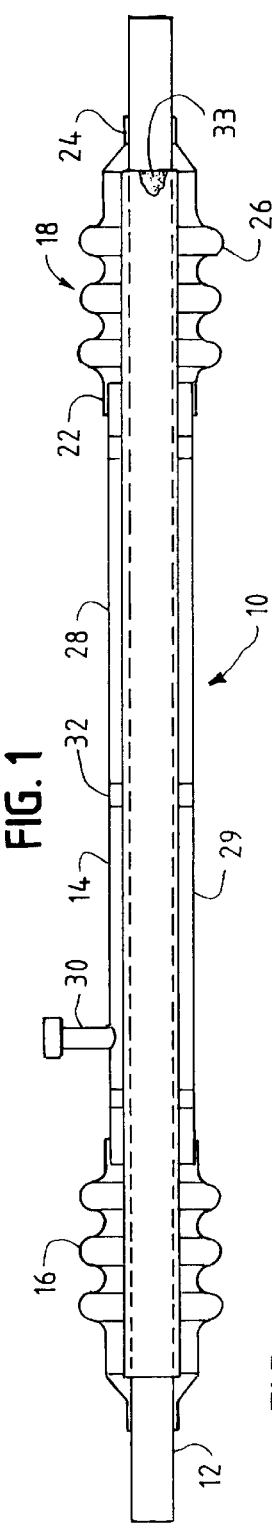
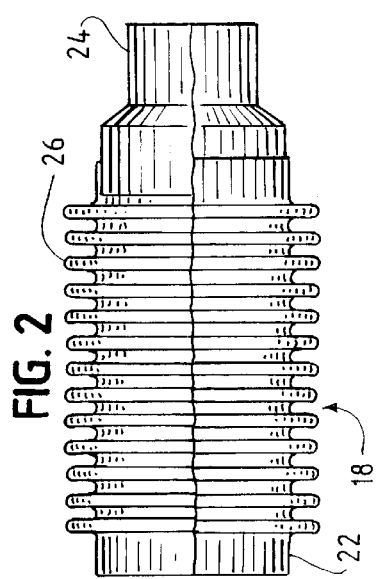
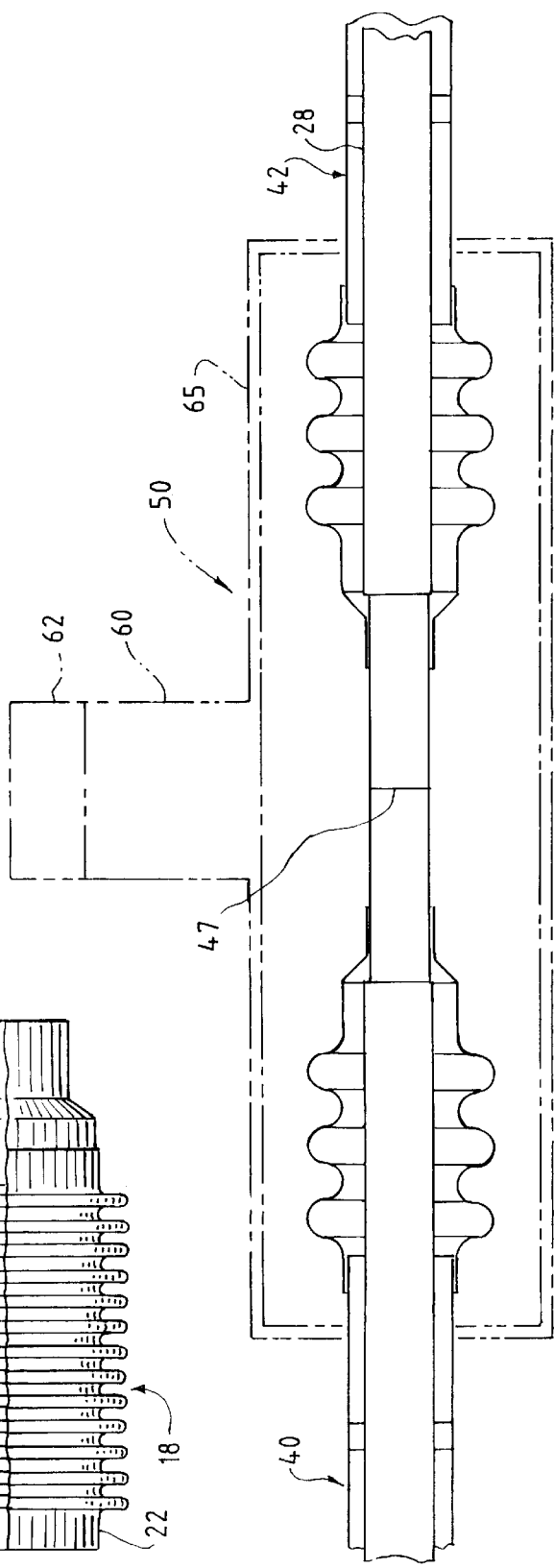

VACUUM INSULATED PIPE

CROSS REFERENCE TO RELATED APPLICATIONS

This application is a continuation-in-part of U.S. application Ser. No. 09/181,297 filed Oct. 28, 1998.

BACKGROUND OF THE INVENTION

The invention relates generally to insulated piping, and, more particularly, to prefabricated vacuum-insulated pipe sections and a method of joining them.

Thermally insulated pipes have a wide variety of industrial applications. For example, insulated piping is used to transport cryogenic liquids, that is, liquids having a boiling point at a temperature below −150° F. at atmospheric pressure, between storage tanks or between a storage tank and a use device. Other examples include utilization in chemical plants or petroleum refining.

A major source of thermal leakage in insulated pipe systems is at the junction between two pipe sections. It is therefore preferable to eliminate such pipe joints. This would require, however, that the insulating piping be custom-manufactured to fulfill the length requirements of specific applications. Such an arrangement would be prohibitively expensive. As a result, efforts have been directed towards developing prefabricated insulated pipe sections that may be connected with joints that suffer from minimal thermal leakage. An appropriate number of such sections may be delivered and joined in the field to create efficient piping systems of desired lengths.

One type of prefabricated insulated pipe features sections constructed of copper pipe surrounded by foam insulation. The foam insulation is surrounded and protected by a PVC plastic casing. Such foam preinsulated pipe is offered under the names X-50 by Process and Cryogenic Services, Inc. of San Jose, Calif. and INSULTEK by Insultek Piping Systems of Manlius, N.Y.

Sections of foam preinsulated pipe are typically joined by brazing or butt-welding. Alternatively, the ends of the sections may be threaded. Foam insulation is next wrapped, placed, foamed or fitted around the joint. A "clam shell" is then placed over the foam insulation so as to protect it and secure it in place. The claim shell is typically constructed of stamped thin metal or molded plastic and features two halves that are riveted, glued or otherwise joined together when the clam shell is in position.

While the above foam preinsulated pipe system offers the advantage of low cost, higher performance levels are required by a number of present-day applications. The efficiency of the foam preinsulated pipe is typically 1435 BTU/hr overall heat loss per 100 feet of 1 inch pipe when liquid nitrogen is carried. In addition, greater service life is desired. Foam preinsulated pipe often needs extensive repair or replacement after a short service life to maintain insulating performance at original levels.

Another type ofprefabricated pipe features vacuum-insulated sections. This system is offered by MVE, Inc. of New Prague, Minn. under the name VIP. A VIP pipe section is constructed of an inner pipe surrounded by an outer pipe. The inner pipe and outer pipe are concentrically positioned so that an annular insulation space is formed therebetween. The ends of the outer pipe are welded to the inner pipe so that the annular space is sealed. Either the inner pipe or the outer pipe is provided with a bellows in its middle portion so that the integrity of the welds is preserved when the pipes expand or contract by differing amounts due to temperature changes.

The insulation space of the VIP pipe is evacuated and filled with a multiplicity of layers of thin fabric forned of fine fibers of glass, cellulose or other fibrous material characterized by low heat conductivity. Positioned between the thin fabric layers are reflective barrier sheets forimed of highly reflective material, such as an aluminum foil. When utilized in cryogenic liquid applications, the insulation arrangement of VIP pipe minimizes conduction and radiation heat gain to the cryogen within the inner pipes.

While VIP pipe sections may be connected in a manner similar to foam-insulated pipes, that is, with insulated clam shells, they are optimallyjoined by a bayonet connector arrangement such as is disclosed in U.S. Pat. No. 4,491,347 to Gustafson. The '347 patent discloses pipe sections that have interfitting metal male and female end portions. The material of the female portion has a coefficient of expansion that is greater than that of the male portion. As a result, when cryogenic liquid flows through the pipe sections, the female portion contracts into sealing relationship with the male portion.

Vacuum-insulated pipe such as the VIP is at the opposite end of the spectrum from foam preinsulated pipe in terms of both performance and cost. More specifically, the efficiency of the VIP system is much higher, with an overall heat loss of only 160 BTU/hr for 100 feet of 1 inch pipe when liquid nitrogen is carried. In addition, vacuum-insulated pipes such as the VIP typically retain their original insulating capabilities for fifteen to twenty years. The complexity of vacuum-insulated pipe with bayoneted ends, however, makes piping systems such as the VIP expensive to produce.

A further disadvantage associated with existing vacuum-insulated piping is that when the expansion/contraction bellows comprises a portion of the outer pipe, it is exposed to the weather and may otherwise be damaged. Alternatively, if the bellows comprises a portion of the inner pipe, it is difficult to repair and replace.

Accordingly, it is an object of the present invention to provide an insulated pipe that may be produced and installed in prefabricated sections.

It is another object of the present invention to provide an insulated pipe that offers high insulative efficiency at a reasonable cost.

It is another object of the present invention to provide an insulated pipe that has a long service life.

It is still another object of the present invention to provide an insulated pipe that is durable and that may be easily repaired.

It is another object of the present invention to provide a vacuum-tight joint between sections of the insulated pipe.

It is another object of the present invention to provide a connection between the insulated pipes that aid in thermal expansion and contraction of the insulated pipe.

SUMMARY OF THE INVENTION

The present invention is directed to an insulated piping system for transferring temperature-sensitive fluids such as cryogenic liquids, coolants, hydrocarbons, or steam. The system consists of prefabricated sections of pipe. Each section of pipe includes an inner pipe and an outer pipe concentrically positioned about the inner pipe. The end portions of the inner and outer pipes are joined by a pair of bellow members so that an annular space is defined therebetween. The annular space is partially evacuated. Insulating material covers a portion of the inner pipe. Preferably, this insulating material is wrapped in layers about the inner pipe with inert insulating granules placed between the layers of insulation. A number of spacers may be attached to the insulation. The outer pipe features a port to permit evacuation of the annular space in the field.

The inner pipes of the prefabricated pipe sections are joined by brazing or butt-welding. Alternatively, the inner pipes may be joined via threaded ends or a bellow member. The transition bellow members on adjacent pipe sections and the joint are covered by a sleeve that forms a vacuum. This dramatically improves thermal performance of the joint.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 1 is a partial sectional side elevation showing a section of the vacuum insulated pipe of the present invention with the insulation material on the inner pipe partially broken away;

FIG. 2 is a partially broken away side elevation of one of the transition elements of the insulated pipe of FIG. 1;

FIG. 3 is a partial sectional side elevation view of two sections of vacuum insulated pipe of the type shown in FIG. 1 joined in accordance with the present invention;

DESCRIPTION OF THE PREFERRED EMBODIMENTS

Figure 4:
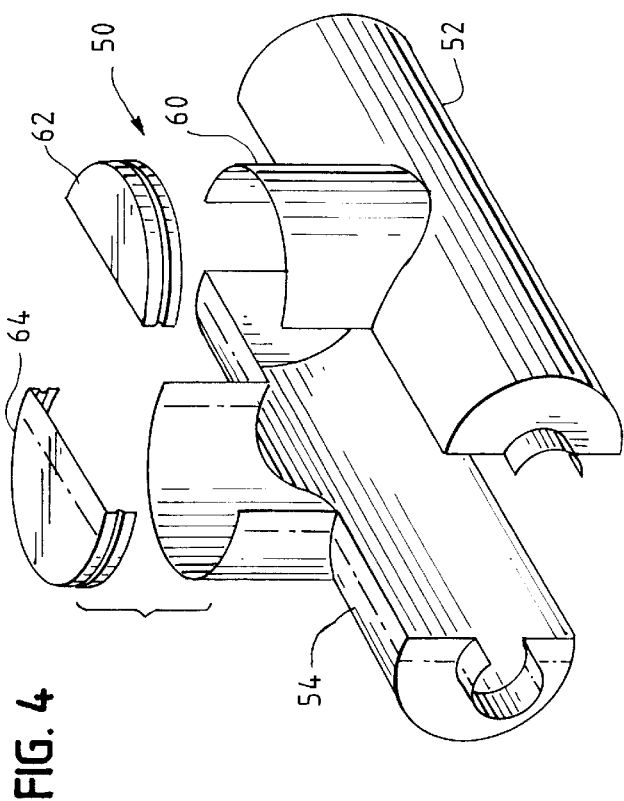
FIG. 4 is an exploded perspective view of the clam shell housing of the joint of FIG. 3 prior to installation.

With reference to FIG. 1, a section of insulated pipe constructed in accordance with the present invention is indicated generally at 10. The section features concentrically positioned inner pipe 12 and outer pipe 14 which are constructed with materials and thicknesses tailored to a given application. Examples of suitable materials include, but are not limited to, ferrous or non-ferrous metals such as copper or stainless steel. The outer pipe may feature a wall that is thicker than the inner pipe to provide for additional resistance to corrosion and vacuum support.

A pair of bellow members 16 and 18 are connected between the inner and outer pipes. Bellow members 16 and 18 may be constructed of metal. As shown in FIG. 2, each bellow member features a pair of non-corrugated end portions 22 and 24 and a corrugated middle portion 26. The diameter of one of the end portions 22 is sized to be sliglhtly larger than that of the outer pipe 14 while the other end portion 24 features a diameter that is slightly larger than that of the inner pipe 12. As shown in FIG. 1, the bellow members are welded to the end portions of the inner and outer pipes so that a sealed annular space 28 is defined therebetween. Alternatively, the diameter of the end portions 22 and 24 can be the same diameter of the outer pipe 14 and the inner pipe 12, respectively, so that the end portions and the pipes can be connected by a butt weld joint.

In addition to sealing the annular space, the bellow members perform two other functions. First, they allow for independent expansion and contraction of the inner pipe relative to the outer pipe without disturbing the integrity of the welds. For example, the inner pipe may contract extensively compared to the outer pipe when liquid or gas ranging in temperature from −320° F. to +400° F. passes through it. Under such circumstances, each bellow member would contract or expand by a corresponding amount so that the resulting stresses in the welds and on the outer pipe are minimal. The placement of the bellow members between the inner and outer pipes allows each section of pipe to handle thermal expansion and contraction for fluids in the range of −320° F. to +400° F.

The other important function of the bellow members is that their corrugated portions lengthen the path of heat transfer between the inner and outer pipes. This increases the insulating efficiency of the pipe segment as heat transfer between the inner and outer pipes is significantly reduced. As a result, heat originating from the exposure of the outer pipe to ambient conditions is not efficiently transferred to the liquid flowing through the inner pipe. Conversely, heat from a hot liquid flowing through the inner pipe is not easily transferred through the bellow members to the outer pipe.

As shown in FIG. 1, a portion of the inner pipe 12 is covered with insulation material 29. For example, the inner pipe may be wrapped with multiple layers of a blanket insulation. Alternatively, the inner pipe may be wrapped with super-insulation consisting of alternating layers of thin fabric and reflective material. In either instance, it is preferable to sift in AEROGEL, or similar inert insulating granules, indicated at 33 in the broken away portion of insulation 29 in FIG. 1, between the layers to provide for enhanced insulating performance at poor vacuum levels. The volume of insulating granules as compared to the volume of insulation can be varied, depending upon the application of the pipe, from 1% to 75%.

As illustrated in FIG. 1, low conductivity spacers 32 are clipped, glued, or otherwise attached onto the insulation for longer pipe sections (over approximately six feet). These spacers may be constructed of materials such as ceramic or fiberglass.

As the final step in manufacturing the pipe segment 10, air is evacuated through capped port 30 so that the annular space 28 features a vacuum-like pressure. Alternatively, a hole may be drilled in the outer pipe. Once the air is evacuated through the hole, it may be sealed with an O-ring plug. The capped port 30 or the plugged hole allow the annular space of the pipe to be re-evacuated in the field. That is, the pipe is field-serviceable. By increasing the amount of AEROGEL or other granules between the insulation layers, the vacuum requirements may be less stringent. Reducing the vacuum requirements of the pipe provides the benefits of reduced manufacturing costs and increased service life.

FIG. 3 illustrates how two sections of pipe, such as the one shown in FIG. 1, may be efficiently joined in accordance with the present invention. Opposing ends of adjacent pipe sections 40 and 42 are placed in abutting relation and are brazed, butt-welded or otherwise joined together to form joint 47. Alternatively, the pipe sections may be provided with threaded ends that engage.

Once the pipe sections are joined, a clam shell, indicated in general at 50 in FIG. 4 and in phantom in FIG. 3, is used to cover the joint and the bellow member of each pipe. The clam shell is constructed of molded plastic or a stamped thin metal and features a female half 52 and a male half 54 that engage. Once engaged, the halves may be secured together by rivets or adhesive. The clam shell is joined to the outer pipes of sections 40 and 42, just beyond their bellow members, by a silicon sealant and adhesive or similar substance. It should be noted that while a clam shell is illustrated, alternative covers that are known in the art could be used.

The assembled clam shell is then filled with an insulation such as foam, fiber, glass-foam or powder through port 60. Prefabricated foam sections can also be used. The choice of ilsulating material depends upon the application of the piping system. For example, foam is effective except in situations where the liquid being handled is extremely cold (as with cryogenics) or extremely hot. In the event of the latter, foam will melt and degrade. Powder or fiber would perform better under such conditions. In situations where cryogenic liquid is being handled, the use of foam could present a safety hazard as the possibility exists that oxygen would be liquified against the inner pipe and remain in the foam. This could form a fire hazard. The use of rock wool or glass-foam—both inert in oxygen—produces a cryogenically-safe joint.

Once the clam shell is filled with the appropriate insulating material, port 60 is sealed via cap portions 62 and 64. As an alternative to port 60, a hole may be placed through the clam shell and later sealed after the insulation is inserted. As yet another alternative to enhance performance, blanket insulation could be wrapped around the joint prior to installation of the clam shell. The clam shell may be lined with metal foil or plastic prior to assembly to provide a vapor barrier 65 for the insulation.

The placement of the joint and the bellow members within the clam shell offers a number of benefits. The expansion and contraction of the bellow members takes place within the clam shell. Movement of the outer pipes with respect to the clam shell is minimized so that the sealing of the clam shell is maintained. This prevents the leakage of water or other liquids into the interior of the clam shell, the occurrence of which may severely degrade the performance of the insulation.

The bellow members, and the welds connecting them to the inner and outer pipes, are also protected by the clam shell from weather or damage from another source. In addition, the clam shell itself will be protected from damage that could occur if the outer pipe expanded and contracted excessively.

It has been found that the performance of the piping system of the present invention is superior to traditional foam-insulated piping in terms of insulating capability and service life. More specifically, the thermal conductivity of the insulation of the piping of the present invention may be up to fourteen times lower than foam. As a result, the heat loss for the piping system of the present invention is typically 255 BTU/hr overall loss per 100 feet of 1 inch pipe (as compared to 1435 BTU/hr for foam-insulated pipe) when liquid nitrogen is carried.

One implication of the improved performance of the pipe of the present invention is that much longer unrefrigerated (or unheated) piping runs are possible. The increased efficiency also allows the pipe of the present invention to feature a smaller cross section than a comparable foam-insulated pipe. More specifically, a foam-insulated pipe typically has more than a six inch diameter while an insulated pipe with better performance constructed in accordance with the present invention typically has a two inch diameter.

The service life of the piping system of the present invention is significantly higher than that of foam-insulated systems. In fact, it is estimated that the service life of the piping of the present invention may be three to five times as long.

The piping system of the present invention offers all of the above advantages at a cost that is significantly lower than that of traditional vacuum-pipe systems that are joined via bayoneted ends or welded and evacuated field joints.

It should be noted that while piping with a round cross section is illustrated in the figures, the present invention could be applied to piping systems with alternative cross section shapes (such as square, oval, etc.)

Figure 5:
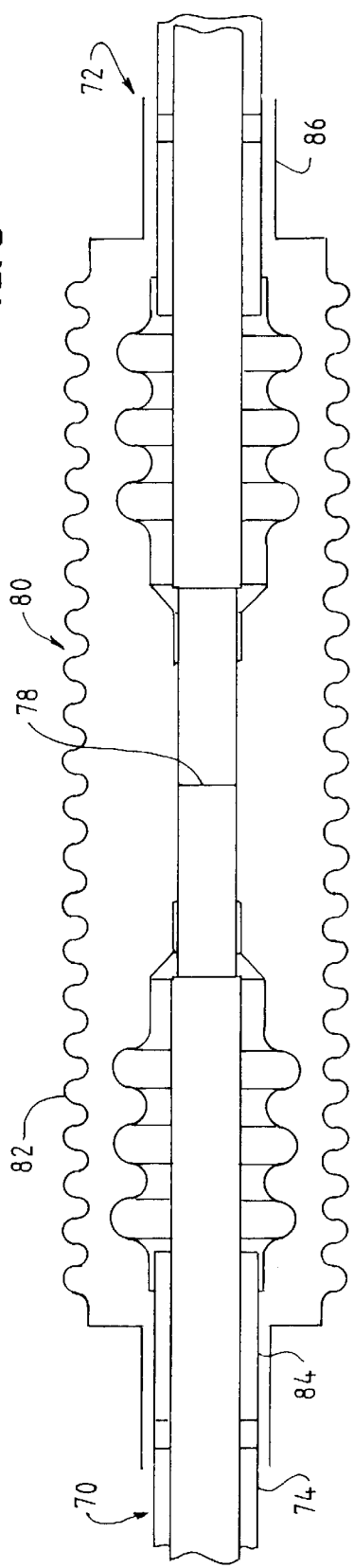
FIG. 5 is a partial sectional side view of two sections of the insulated pipe of the type shown in FIG. 1 joined by the vacuum sleeve shown in FIG. 6 to form a vacuum insulated joint.

An alternative embodiment of the vacuum insulated pipe system is shown in FIG. 5 where the connection between insulating pipes 70 and 72 is covered by a vacuum sleeve 80. The vacuum sleeve 80 provides an improved connection that further eliminates thermal leakage. The vacuum sleeve 80 protects the bellow members, welds connecting the bellow members to the inner and outer pipes, and the connection between the inner pipes from weather or damage from another source. The point of connection 78 between the inner pipe sections is not insulated thereby providing a source of thermal leakage at the welded joint. However, the vacuum sleeve 80 increases the efficiency of the insulated pipe system by providing a sleeve that covers the welded connection between the inner pipe sections. The vacuum sleeve 80 is positioned over the connection between two insulated pipes 70 and 72 and provides a vacuum tight joint over the connection without any additional insulating materials. Further, the vacuum sleeve 80 prevents any potential fire hazards caused by the use of foam and provides for easier installation of the vacuum insulated pipe system.

Figure 6:
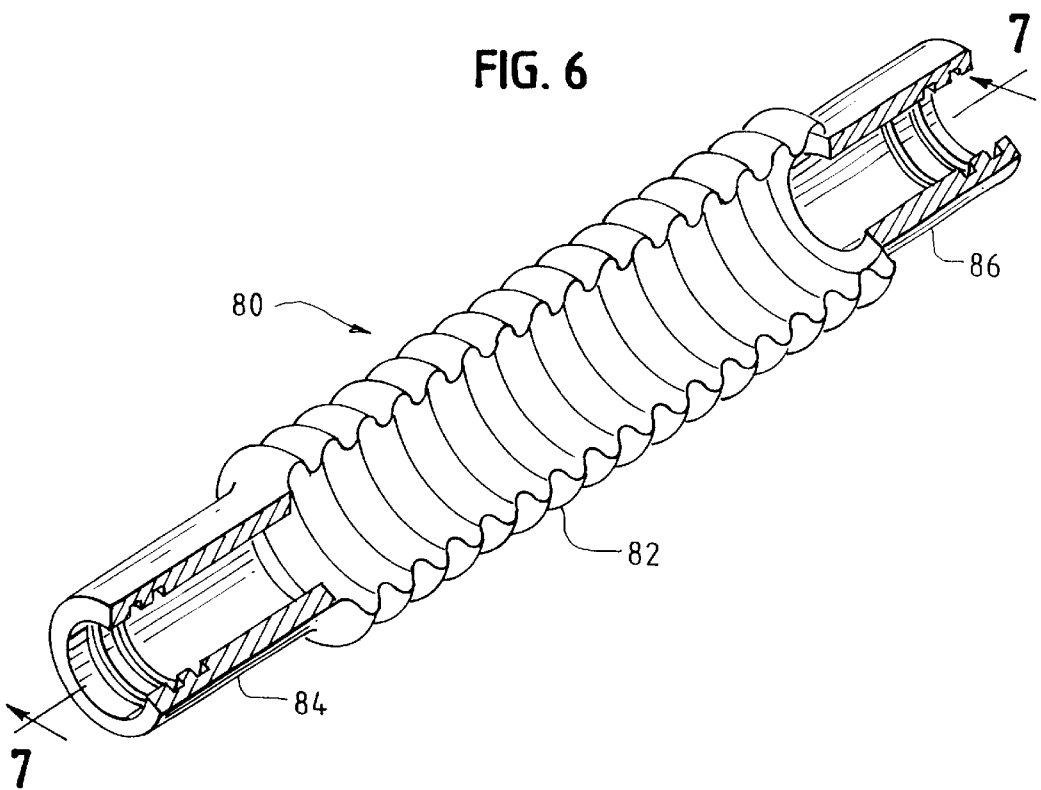
FIG. 6 is a partially broken away perspective view of an embodiment of the vacuum sleeve of the present invention.

FIG. 6 illustrates the vacuum sleeve 80 with a corrugated central section 82 and two tubular end sections 84, 86. One of the tubular end sections 84, 86 extends from each end of the corrugated central section 82. The material of the corrugated central section may be, but is not limited to, copper, aluminum, or stainless steel. The diameter of each tubular end sections 84, 86 is slightly larger than the diameter of each outer pipe 74, 76 which enables the vacuum sleeve 80 to slide over the insulated pipe of the present invention. The tubular end sections 84, 86 can be connected to the outer pipes 74, 76 of the insulated pipe system by various connection methods.

It should be noted that, alternatively, the vacuum sleeve 80 may be without corrugations, and thermal contraction and expansion may be adjusted by sliding O-Ring seals on an expansion sleeve in the pipe joint.

Figure 7:
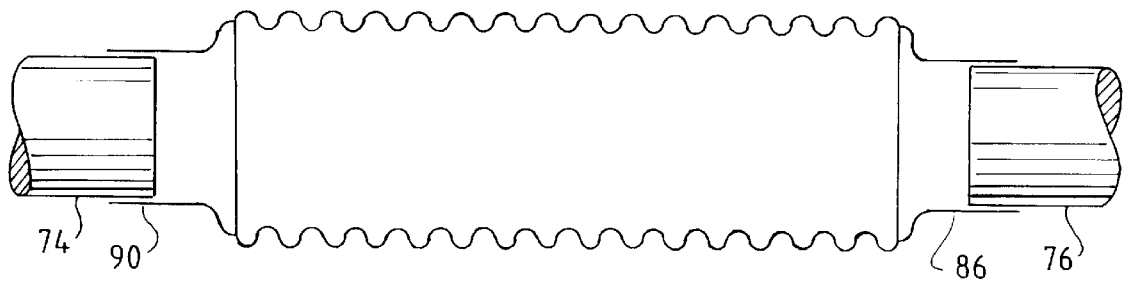
FIG. 7 is a sectional view of a second embodiment of the vacuum sleeve of the present invention taken along line 7—7 soldered or glued into position upon a pair of joined pipe sections.
Figure 8:
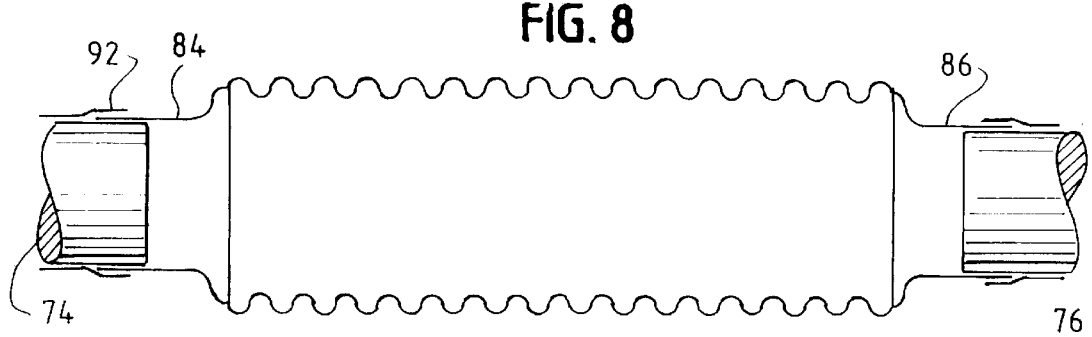
FIG. 8 is a sectional view of a third embodiment of the vacuum sleeve of the present invention taken along line 7—7 secured into position by a collar upon a pair of joined pipe sections.
Figure 9:
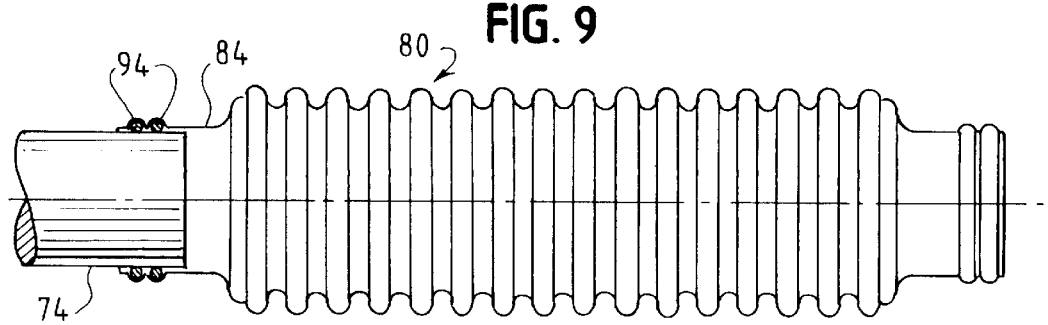
FIG. 9 is a sectional view of a fourth embodiment of the vacuum sleeve of the present invention taken along line 7—7 secured into position by O-rings upon a pair of joined pipe sections.
Figure 10:
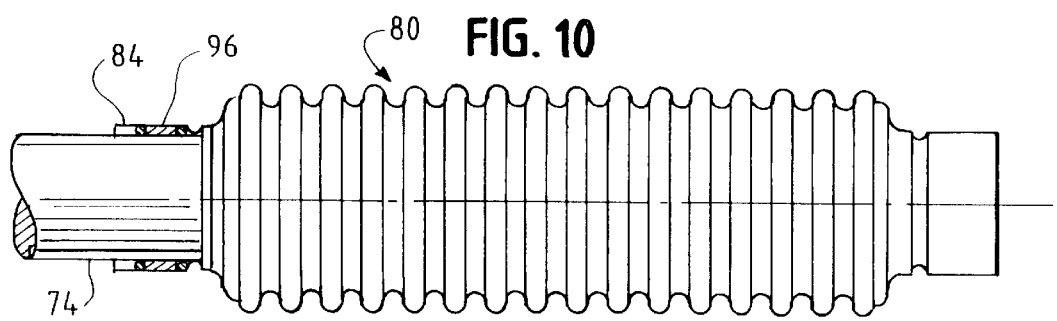
FIG. 10 is a sectional view of a fifth embodiment of the vacuum sleeve of the present invention taken along line 7—7 secured into position by O-rings combined with a spacer upon a pair of joined pipe sections.
Figure 11:
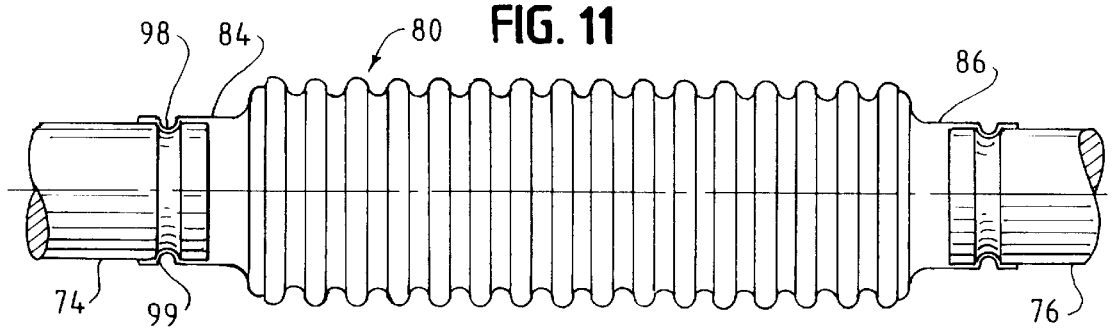
FIG. 11 is a sectional view of a sixth embodiment of the vacuum sleeve of the present invention taken along line 7—7 secured into position by internal and external grooves upon a pair of joined pipe sections.

FIGS. 7–11 illustrate various types of connection methods of the present invention. FIG. 7 illustrates the tubular end sections 84, 86 soldered or glued 90 to the outer pipes 74, 76 of an insulated pipe system. FIG. 8 illustrates the tubular end sections 84, 86 secured to the outer pipes 74, 76 of an insulated pipe system by a collar 92 and an adhesive. FIG. 9 illustrates the tubular end sections 84, 86 secured to the outer pipes 74, 76 of an insulated pipe system by O-rings 94. FIG. 10 illustrates the tubular end sections 84, 86 secured to the outer pipes 74, 76 of an insulated pipe system by O-rings 94 combined with a spacer 96. The spacer 96 maintains the position of the O-rings 94 to form the tightjoint connection. FIG. 11 illustrates the tubular end sections 84, 86 secured to the outer pipes 74, 76 by internal grooves 98, external grooves 99, and an adhesive. The outer pipes 74, 76 illustrated in FIG. 11 are configured with an internal groove 98 and the tubular end sections 84, 86 illustrated in FIG. 11 are configured with an external groove 99. The joint is assembled by applying an adhesive to the internal groove 98 and positioning the external groove 99 into a locking connection with the internal groove 98 to form a tight joint connection.

The vacuum sleeve of the present invention allows the inner pipe to expand and contract relative to the outer pipe as fluid passes through the insulated pipe. The expansion and contraction of the bellow members takes place within the vacuum sleeve. Movement of the outer pipes with respect to the vacuum sleeve is minimal so the sealing between the insulated pipe and the vacuum sleeve is maintained.

The vacuum sleeve is assembled over the pipes and the bellow member of each insulated pipe system by sliding the vacuum sleeve over a portion of the insulated pipe. Next, the two inner pipes are connected. The vacuum sleeve is than slid along the insulated pipe, over the bellows member until the vacuum sleeve covers the connection between the two inner pipes. The tubular end sections of the vacuum sleeve are position over the outer pipe and are sealed to the outer pipe by one of the connection methods described above and illustrated in FIGS. 7–11.

Figure 12:
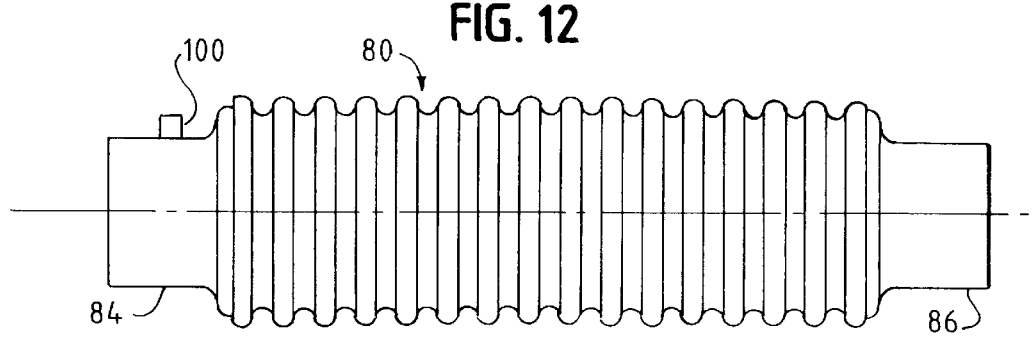
FIG. 12 is a sectional view of the vacuum sleeve of the present embodiment with a pump-out port attached to the vacuum sleeve.

As seen in FIG. 12, the vacuum sleeve 80 includes a pump out port 100. A vacuum pump that is well known in the art is connected to the pump out port 100. The vacuum pump evacuates the air in the space 81 between the vacuum sleeve 80 and the insulated pipes 70,72. The port 100 is then sealed by a slip on closure or a welded seal to forn a vacuum insulated joint. Examples of suitable seals include, but are not limited to, a cap, a plug, brazing, soft solder, or a cold weld.

Another method of forming the vacuum insulated joint is by displacing the air in the space 81 with a gaseous compound which solidifies at operating temperatures. The vacuum sleeve 80 is designed with two ports such that a gaseous compound, for example carbon dioxide, is received in one port while air is evacuated through the other port. Once the air is evacuated, the ports are sealed by one of the various methods described above.

Alternatively, the vacuum sleeve can be pressurized with a gaseous compound by inserting the gaseous compound into a single port. The vacuum sleeve is than depressurized releasing some of the air that was in the space 81 between the vacuum sleeve 80 and the insulated pipes 70, 72. This process is repeated until the space 81 is substantially filled with a gaseous compound, such as carbon dioxide. The port is then sealed by one of the methods described above.

When a fluid passes through the insulated pipe system at operating temperatures, the gaseous compound begins to solidify. As the gaseous compound turns to a solid, it creates a vacuum between the vacuum sleeve 80 and the insulated pipes 70, 72. This system creates the vacuum insulation as desired.

An optional feature of the present invention is to include a getter placed in the space 81 between the vacuum sleeve 80 and the insulated pipes 70, 72. The getter addresses the problem of out-gassing and chemically absorbs the gas remaining after the cryogenic fluid passes through the system. Alternatively, the out-gassing problem can be addressed by inserting a moisture absorbent. The system is heated to a point above where moisture is absorbed and the space 81 is filled with steam. As the vacuum insulated joint cools, the steam condenses into water and the water and any excess gas are absorbed.

Figure 13:
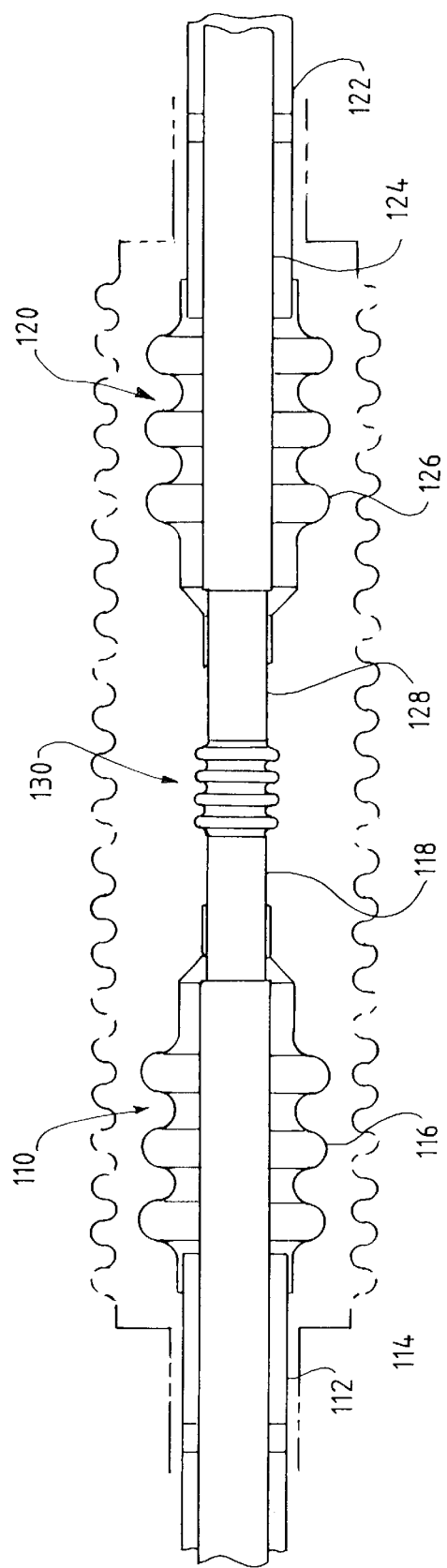
FIG. 13 is a side view of two insulated pipes connected with by bellow section.

Additionally, an alternative embodiment of the present invention is shown in FIG. 13. FIG. 13 illustrates two insulated pipes 110, 120 connected byabellows section 130. The inner pipes 118, 128 of the insulated pipes 110, 120 are connected to each side of the bellows section 130. The bellows section 130 is welded to the inner pipes 118, 128. This bellow section 130 allows the joint to expand or contract with the insulated pipe such that the sections of the insulated pipe no longer expand or contract with respect to each other. This alternative embodiment facilities installations of the pipe. The vacuum sleeve 80 is then mounted over the pipe as previously described and as indicated in phantom in FIG. 13.

While the preferred embodiments of the invention have been shown and described, it will be apparent to those skilled in the art that changes and modifications may be made therein without departing from the spirit of the invention, the scope of which is defined by the appended claims.

What is claimed is:

1. A sleeve for covering a joint in an insulated pipe system for insulating said joint, said sleeve comprising:
   a) a central section concentrically disposed over the joint to form an enclosed chamber between the central section and the joint, said central section corrugated to allow for thermal expansion;
   b) tubular sections joined to each end of the central section, each tubular section adapted to sealingly engage said insulated pipe system; and
   c) means for sealing the tubular sections to said insulated pipe system,
   whereby the enclosed chamber may be evacuated or filled with an insulation compound to thermally insulate said joint.

2. A sleeve for covering a joint in an insulated pipe system for insulating said joint, said sleeve comprising:
   a) a central section concentrically disposed over the joint to form an enclosed chamber between the central section and the joint;
   b) tubular sections joined to each end of the central section, each tubular section adapted to sealingly engage said insulated pipe system; and
   c) means for sealing the tubular sections to said insulated pipe system, said means for sealing the tubular sections includes a solder joint,
   whereby the enclosed chamber may be evacuated or filled with an insulation compound to thermally insulate said joint.

3. A sleeve for covering a joint in an insulated pipe system for insulating said joint, said sleeve comprising:
 a) a central section concentrically disposed over the joint to form an enclosed chamber between the central section and the joint;
 b) tubular sections joined to each end of the central section, each tubular section adapted to sealingly engage said insulated pipe system; and
 c) means for sealing the tubular sections to said insulated pipe system, said means for sealing the tubular sections includes a collar for securing the tubular sections and the insulated pipe system to form a tight joint connection,
 whereby the enclosed chamber may be evacuated or filled with an insulation compound to thermally insulate said joint.

4. A sleeve for covering a joint in an insulated pipe system for insulating said joint, said sleeve comprising:
 a) a central section concentrically disposed over the joint to form an enclosed chamber between the central section and the joint;
 b) tubular sections joined to each end of the central section, each tubular section adapted to sealingly engage said insulated pipe system; and
 c) means for sealing the tubular sections to said insulated pipe system, said means for sealing the tubular sections includes at least two O-rings.
 whereby the enclosed chamber may be evacuated or filled with an insulation compound to thermally insulate said joint.

5. A sleeve for covering a joint in an insulated pipe system for insulating said joint, said sleeve comprising:
 a) a central section concentrically disposed over the joint to form an enclosed chamber between the central section and the joint;
 b) tubular sections joined to each end of the central section, each tubular section adapted to sealingly engage said insulated pipe system; and
 c) means for sealing the tubular sections to said insulated pipe system, said means for sealing the tubular sections includes an internal and external groove for securing the tubular sections and the insulated pipe system to form a tight joint connection,
 whereby the enclosed chamber may be evacuated or filled with an insulation compound to thermally insulate said joint.

6. The sleeve of claim 4 wherein said means for sealing the tubular sections includes a spacer between said at least two O-rings.

7. The sleeve of claim 1 further comprising a means for substantially evacuating air from the enclosed chamber.

8. The sleeve of claim 1 further comprising means for inserting a gaseous compound which solidifies at cryogenic temperatures into the enclosed chamber thereby creating a partial vacuum in the enclosed chamber when cryogenic fluids are flowing through the insulated pipe system.

9. An insulated piping system for conveying fluids which are at temperatures deviating greatly from ambient comprising:
 a) at least two pipe sections, each including:
  i) an inner pipe having a pair of opposite end portions;
  ii) an outer pipe having a pair of opposite end portions, said outer pipe concentrically disposed about the inner pipe;
  iii) bellow members each having a corrugated middle portion with a pair of cylindrical non-corrugated end portions connected directly thereto, said end portions of said inner and outer pipes so that an enclosed annular space is defined between said pipes;
 b) the end portions of the inner pipes, of said at least two pipe sections, being connected so that the inner pipes are in communication with one another for fluid flow therethrough; and
 c) at least one sleeve for covering the inner pipe connection, including:
  i) a central section concentrically disposed over the inner pipe connection forming an enclosed chamber over the inner pipe connection;
  ii) tubular sections joined to each end of the central section, each tubular section adapted to engage said pipe sections; and
  iii) means for sealing the tubular members to said pipe sections.

10. The insulated piping system of claim 9, further comprising a bellow section having opposite end portions welded to the end portions of the inner pipe of each pipe section.

11. The insulated piping system of claim 9 wherein said sleeve further includes a means for substantially evacuating air from the enclosed chamber.

12. The insulating piping system of claim 9 wherein said sleeve further includes means for inserting a gaseous compound which solidifies at cryogenic temperatures into the enclosed chamber thereby creating a partial vacuum in said space when cryogenic fluids are flowing therethrough.

* * * * *